United States Patent [19]
Shirakawa

[11] 4,291,361
[45] Sep. 22, 1981

[54] TRIMMER CAPACITOR

[75] Inventor: Takashi Shirakawa, Morioka, Japan

[73] Assignee: Alps Electric Co., Ltd., Tokyo, Japan

[21] Appl. No.: 157,943

[22] Filed: Jun. 9, 1980

[30] Foreign Application Priority Data

Jun. 12, 1979 [JP] Japan ............... 54-799657[U]

[51] Int. Cl.³ .............................................. H01G 5/06
[52] U.S. Cl. ...................................... 361/293; 361/292
[58] Field of Search ................................ 361/293, 292

[56] References Cited

U.S. PATENT DOCUMENTS 3,953,771   4/1976   Bremstahler ................. 361/293

FOREIGN PATENT DOCUMENTS 137635   9/1979   Fed. Rep. of Germany ...... 361/293
807382   1/1959   United Kingdom ................ 361/293

*Primary Examiner*—E. A. Goldberg
*Attorney, Agent, or Firm*—Guy W. Shoup; Gerard F. Dunne

[57] ABSTRACT

A trimmer capacitor has a rotor electrode which slides on two stator electrodes which are on a substrate, one of which is a ground electrode connected to the rotor. To maintain accurate thickness in the trimmer, an insulating plate is applied under the ground stator electrode and on the top surface of the other stator electrode.

3 Claims, 2 Drawing Figures

TRIMMER CAPACITOR

BACKGROUND OF THE INVENTION

The present invention relates to a small-sized trimmer capacitor, and more particularly to the electrode structure thereof.

In general, a trimmer capacitor is constructed of an insulating substrate, a ground stator plate lying over one half of the upper surface of an insulating substrate, a hot stator plate lying over the other half of the upper surface of the insulating substrate and having a dielectric film disposed between it and the substrate, and a substantially semicircular rotor plate which is adapted to slide over both the stator plates while remaining in electrical contact with the ground stator plate.

The dielectric film is normally adhered to the hot stator plate, and various sythetic resins are typically used. A thermocompression lamination process is normally the preferred method of adhering the dielectric film to the substrate but, unfortunately, there are very few materials which are both excellent in the radio-frequency electrical characteristics and which can also be readily adhered to metals. At the present time a polyethylene film subjected to radiation irradiation or the like is the only practical material.

Although such polytheylene film is very good in the radio frequency characteristics, it is comparatively small in its specific inductive capacity $\epsilon_r$. In the case where it is intended to make the capacitance value of the trimmer capacitor quite large per unit area, it is necessary to make the thickness of the polyethylene film small and the electrode spaceing short. In this regard, since polyethylene is low in mechanical strength and thermal resistance, the maintenance of an accurate thickness is difficult in the production of the film for thicknesses of and below 25 $\mu$m. In consequence, the hot stator plate laminated with the polyethylene film is prone to have a non-uniform thickness and to cause a step or level difference between its surface and the surface of the ground stator plate. This leads to the disadvantage that the close contact and the electric conduction between the ground stator plate and the rotor plate become unstable.

SUMMARY OF THE INVENTION

It is therefore an object of the present invention to provide a trimmer capacitor in which a step does not appear between the upper surfaces of two stator plates.

Another object of the present invention is to provide a trimmer capacitor in which the close contact between a rotor plate and a stator plate is excellent.

Still another object of the present invention is to provide a trimmer capacitor which is readily assembled.

Further objects and advantages of the present invention will become apparent from the description of an embodiment taken in conjuction with the drawings.

PREFERRED EMBODIMENT OF THE INVENTION

Figure 1:
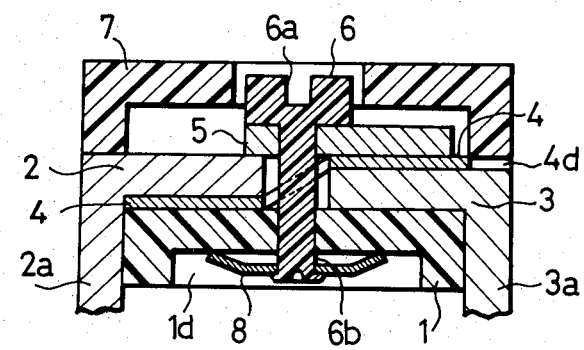
FIG. 1 is a sectional side elevation of an embodiment of a trimmer capacitor according to the present invention.
Figure 2:
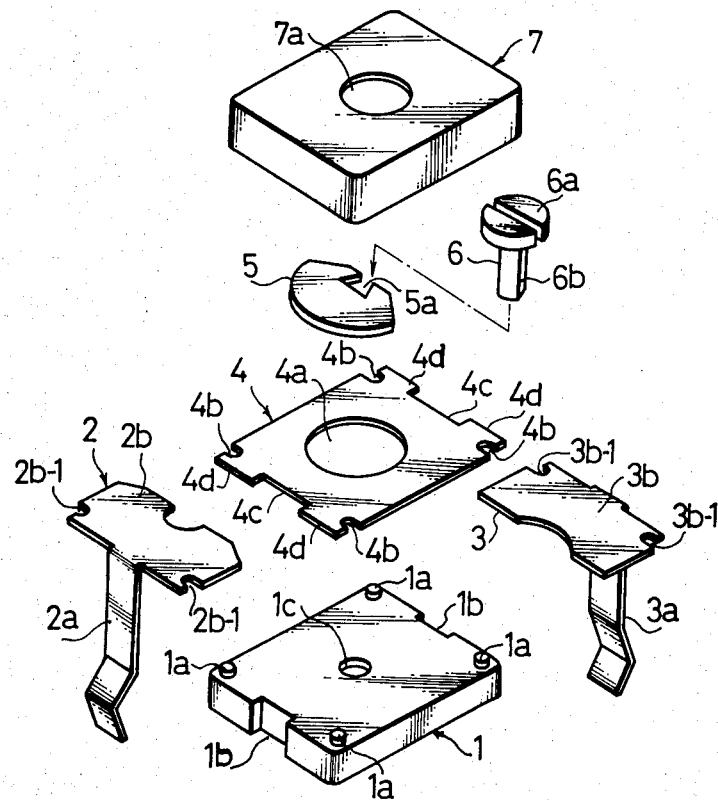
FIG. 2 is an exploded perspective view of the embodiment shown in FIG. 1.

Referring to the figures, numeral 1 designates an insulating substrate which is substantially rectangular and which is made of ceramics or an insulating synthetic resin. The insulating substrate 1 is formed with protruberances 1a extending upwardly from the respective corners of its upper surface, notches 1b and 1b form in opposing side surfaces, a hole 1c extending through its central part, and a central recess 1d formed within its bottom surface. Numeral 2 designates a ground stator plate which is made of an electrically-conductive metal sheet. The ground stator plate 2 is unitarily formed with a terminal portion 2a which snugly fits in one notch 1b, and its plate portion 2b is provided with notches 2b-1 and 2b-1 in which two of the protuberances 1a fit snugly. Shown at numeral 3 is a hot stator plate, for which a sheet made of the same material and having the same thickness as that of the ground stator plate 2 is selected and which is provided with a terminal portion 3a, a plate portion 3b and notches 3b-1 and 3b-1.

Numeral 4 indicates a dielectric film which is made of polyethylene or the like and which is large enough to cover both the stator plates 2 and 3. It is formed with a central hole 4a, notches 4b, and side notches 4c and 4c.

A rotor plate 5 is made of an electrically-conductive metal plate, and presents a fan shape. It is provided with a notch 5a in which a rotor shaft 6 to be described below fits snugly.

The rotor shaft 6 consists of an operating portion 6a which is provided with a screwdriver slot, and a shaft portion 6b. The shaft portion 6b has a non-circular cross section and is snugly fitted in the notch 5a of the rotor plate 5, whereby both the components 5 and 6 can be unitarily rotated.

Numeral 7 denotes a cover which is made of a synthetic resin, and which is centrally formed with a hole 7a for causing the operating portion 6a of the rotor shaft 6 to face the exterior. The cover 7 is made integral with the insulating substrate 1 by ultrasonic welding or the like.

In assembling the trimmer capacitor, one side of the dielectric film 4 is placed on the insulating substrate 1, and the ground stator plate 2 is mounted over this side of the dielectric film lying on the insulating substrate 1. In this case, the ground stator plate 2 has its notches 2b-1, 2b-1 and its terminal portion 2a kept in fitted engagement with the protuberances 1a, 1a and the notch 1b of the insulating substrate 1 respectively, so as to be held against rotation on the insulating substrate 1 and also to sandwich the film 4 between the plate portion 2b and the substrate 1. The film 4 is therefore positioned and fastened temporarily, which facilitates the automation of the assemblage.

Thereafter, the hot stator plate 3 is slid between the insulating substrate 1 and the other, or free, side of the dielectric film 4. Likewise to the above, the notches 3b-1, 3b-1 and the terminal portion 3a of the hot stator plate 3 are respectively brought into fitted engagement with the protuberances 1a, 1a and the notch 1b of the insulating substrate 1. Thus, both the components 1 and 3 are unitarily combined.

The rotor shaft 6 to which the rotary plate 5 has been attached is inserted through the central hole 4a of the film 4 and through the hole 1c of the substrate 1, and the fore end of the shaft portion 6b of the rotor shaft 6 is clamped by a spring washer 8 which serves to prevent the rotor shaft with the rotor plate from coming off or shaking. In this case, the rotor is located so that the base of the rotor plate 5 may always lie in contact with the ground stator plate 2.

Lastly, the cover 7 is placed on the resultant structure, and it is made integral with the substrate 1 by welding or the like. Then, the assemblage ends. End parts 4d of the film 4 overlying the hot stator plate 3 are depressed by the cover 7, and are reliably positioned and held in close contact with the hot stator plate 3. Also the part of the film 4, sandwiched between the substrate 1 and the ground stator plate 2 is pressed against the cover 7 and the rotor plate 5 through the plate 2, and is reliably held in a close contact state between the hot stator plate 2 and the insulating substrate 1. Accordingly, the upper surface of the film 4 overlying the hot stator plate 3 and the upper surface of the ground stator plate 2 are even, and no step appears in the contact plane of the rotor 5.

What is claimed is:

1. In a trimmer capacitor having an insulating substrate, a ground stator plate member disposed over half of the surface of the insulating substrate, a hot stator plate member disposed over the other half of the surface of the insulating substrate having its upper surface engaged with a dielectric film, and a substantially semicircular rotor plate member adapted to slide on both the stator plate members while being electrically connected with the ground stator plate member;

a trimmer capacitor characterized in that one half of said dielectric film is interposed between said hot stator plate member and said rotor plate member, while the other half of said dielectric film is interposed between said insulating substrate and said ground stator plate member.

2. A trimmer capacitor according to claim 1, wherein said hot stator plate member and said ground stator plate member are made of an identical material and have equal thicknesses.

3. A trimmer capacitor according to claim 1, wherein each of said hot stator plate member and said ground stator plate member is unitarily formed with an extension which serves as an external connection terminal.

* * * * *